Dec. 3, 1940.  T. WEBER  2,223,650
SEMITRAILER
Filed Dec. 29, 1938
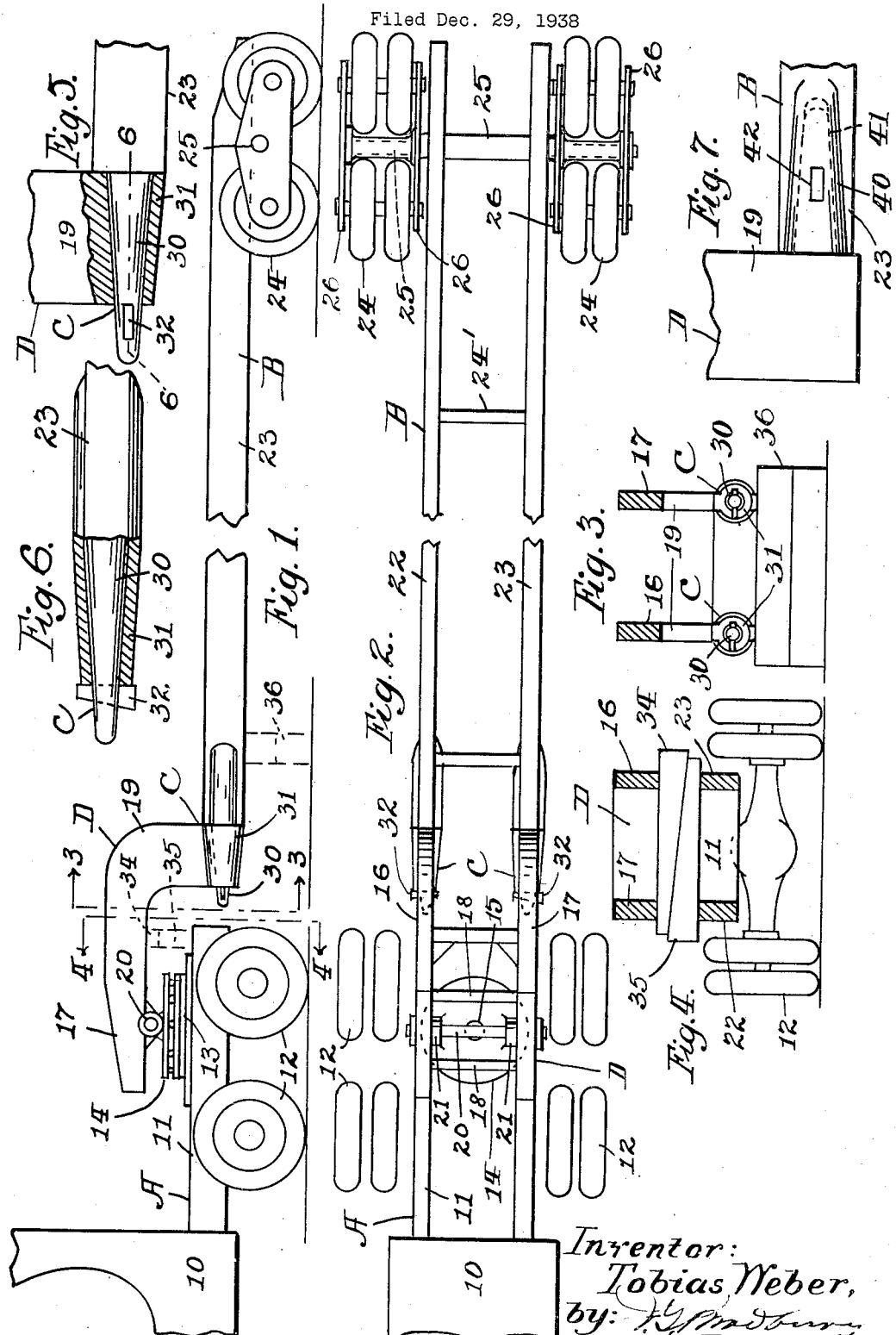
Inventor:
Tobias Weber,
by: [signature]
Attorney.

Patented Dec. 3, 1940

2,223,650

UNITED STATES PATENT OFFICE 2,223,650

SEMITRAILER

Tobias Weber, Los Angeles, Calif.

Application December 29, 1938, Serial No. 248,301

4 Claims. (Cl. 280—106)

An important object of my invention is to provide an improved tractor-trailer vehicle of the semitrailer type in which the number and complexity of parts required to control the coupling and uncoupling operations are reduced to a minimum, and at the same time maintaining maximum strength, safety and simplicity of operation of the vehicle. A further object is to provide in a device of its kind a trailer in which its body bed is extremely low whereby heavy loads or long sections of piping, poles, etc. can be handled to better advantage and more economically. Another object is to provide improved coupling means whereby the trailer can be easily uncoupled from the tractor or re-coupled quickly with ease when the tractor and trailer are disposed at various angles and positions without danger to the operator and damage to the vehicle. Among further objects are maximum simplicity, strength, stability and effectiveness in use.

In the accompanying drawing forming part of this specification, Fig. 1 is a side elevation of my improved tractor-trailer, a detail portion only of the tractor section being shown; Fig. 2 is a plan of the structure shown in Fig. 1; Fig. 3 is a section taken on the line 3—3 of Fig. 1; Fig. 4 is a section taken on line 4—4 of Fig. 1, showing the wedges for supporting the cantilever frame on the tractor body when the trailer is uncoupled from the tractor; Fig. 5 is a side elevation partly in section of a detail showing the coupling joint employed between the tractor and trailer; Fig. 6 is a plan, partly in section on line 6—6 of the structure shown in Fig. 5, and Fig. 7 is a side elevation of a detail showing an alternative construction of the coupling elements.

While I have shown in the drawing and will herein describe the preferred embodiment of the invention, it is to be understood that I do not intend thereby to be limited to the form disclosed but aim to cover all modifications and alternative constructions falling within the spirit and scope of the invention and expressed in the appended claims.

Generally stated, the invention embodies a semitrailer of articulated type adapted to have its forward end supported by the rear end of a tractor and equipped with the usual brakes and other incidental features not shown. In the drawing A indicates a portion of a tractor section which may be of any construction desired and B my improved trailer of articulated type. One member of the trailer is permanently attached to the tractor and the remaining section is joined to the first section by coupling means hereinafter described. The two trailer sections are joined or separated by coupling means C in a particularly simple, strong and novel manner. The tractor section shown herein to illustrate the use of the trailer is of the usual driven type and is adapted to be operated in the usual way from the cab 10. It has a frame 11 supported by the carrier 12 and carries upon its rear end a horizontally disposed plate 13 which constitutes the lower main section of a fifth wheel. This member is rigidly secured to said frame while its companion superimposed member 14 is freely rotatable thereon and secured thereto by the king pin 15 or other suitable means. The rotatable fifth wheel member 14 carries a longitudinally disposed cantilever frame D, consisting of a pair of longitudinal arms 16 and 17 connected by the transverse braces 18 and extending downwardly at their rearward ends to form trailer coupling supporting members 19. The forwardly extending portion of the cantilever frame is tiltingly mounted or hinged upon the upper member 14 of the fifth wheel by the transverse shaft 20 which is secured through a pair of bosses 21, said bosses being formed integral with member 14. This cantilever frame forms the forward member of the articulated frame of the trailer.

The rearward member of the trailer has a chassis frame composed of a pair of longitudinal side bars 22 and 23 spaced apart in parallel relation in a horizontal plane and secured together by cross braces such as 24' or other suitable means. The rearward end of this frame is mounted upon the carrier wheels 24 in the usual manner, it being understood that any type of carrier and method of mounting can be employed. As shown a transverse shaft 25 is secured to the rearward ends of the side bars and a pair of longitudinal supporting plates 26 is journaled on each end of said shaft in which pairs of the carrier wheels are journaled as shown, this structure forming effective carrier means. Each member of the forward ends of the side bars is provided with a forwardly projecting longitudinal tapering coupling pin 30 and the lower extremity of each member of the pair of downwardly extending coupling supports 19 has a longitudinally and rearwardly extending coupling socket 31 to receive and rigidly hold one of said coupling pins. The axes of the pairs of coupling elements coincide in a single horizontal plane when the trailer sections are coupled together and to the tractor section. When coupled a tapering key or keeper 32 is inserted transversely through the outer extremity of each pin 30 to hold the members of each coupling tightly connected. This type of coupling is rigid and of great strength and capable of withstanding severe use while bearing extremely heavy loads. Coupling of the tractor and trailer is effected entirely automatically by simply backing the tractor with the sockets of the cantilever arms in juxtaposition with and receiving the coupling pins into tight engagement, and by inserting the keys 32. Uncoupling is effected by simply removing the keys and driving the tractor forwardly. When in the act of coupling difference in latitude, height and angularity between the tractor and trailer is compensated, to a considerable extent due to tapering the coupling pins and their cooperating sockets. As a result only a rough approximation in the position of the coupling elements is required to perform the coupling function.

When uncoupling the tractor from the trailer the cooperating wedges 34 and 35 are placed below the rearwardly extending cantilever arms and the upper surface of the body frame of the tractor (see Fig. 4), said wedges being shown in full in Fig. 4 and in broken lines in Fig. 1, and a support 36, indicated in broken lines in Fig. 1 and in full in Fig. 3 is placed on the ground or floor below the forward end of the chassis frame B of the trailer. In this condition the tractor can be separated or re-coupled. After coupling, said supports are removed and the tractor and trailer are then ready for operation.

The cantilever coupling support tiltingly mounted to swing in a vertical plane with downwardly extending supporting coupling members for the coupling provides an extremely low bed frame on the trailer which facilitates the handling of extremely heavy loads and articles of extreme length such as drill pipe, casing and poles. Also the pin and socket coupling elements provide an extremely simple, strong and effective means for rigidly holding the cantilever and chassis frames tightly together as a unit when in use substantially without wear and consequent loosening.

The invention contemplates transposing the elements of each coupling, that is providing the socket 40 (see Fig. 7) on a side bar such as 23 of the trailer frame and the cooperating coupling pin 41 on the companion cantilever arm 19 instead of as above described within the spirit of the invention. In this event the tapering of these elements would be rearwardly instead of forwardly and the key 42 would be inserted through the socket as well as the pin.

I claim:

1. A semitrailer having a bed frame, a cantilever at the forward end of said frame adapted to be movably attached to and supported by a tractor, said cantilever having a downwardly extending rearward extremity, and means for separably coupling said bed frame to said cantilever, consisting of a longitudinally disposed pin and pin receiving socket between the forward end of the bed frame and the lower extremity of said cantilever, whereby the bed frame and cantilever may be rigidly united, and readily removable means for holding the pin and companion socket connected.

2. A semitrailer having a bed frame, a cantilever at the forward end of said bed frame adapted to be movably attached to and supported by a tractor, said cantilever having a downwardly extending rearward extremity, and means for separably coupling said bed frame to said cantilever, consisting of a longitudinally disposed and correspondingly tapered pin and pin receiving socket between the forward end of the bed frame and the lower extremity of said cantilever, whereby the bed frame and cantilever may be guided into close connection and rigidly united, and readily removable means for holding the pin and companion socket connected.

3. A semitrailer having a bed frame provided with longitudinally disposed side members, a cantilever element at the forward end of said bed frame adapted to be swiveled to and supported by a tractor and provided with longitudinally disposed side cantilever members having downwardly extending rearward extremities corresponding with the forward ends of the side members of the bed frame, and means for separably coupling said bed frame to said cantilever element, consisting of a longitudinally disposed pin and socket connection between the forward end of each side member of said bed frame and the lower extremity of the corresponding cantilever member whereby a rigid union is provided between said parts, and readily removable means for holding the pin and companion socket of each pin and socket couple connected.

4. A semitrailer having a bed frame provided with longitudinally disposed side members, a cantilever element at the forward end of said bed frame adapted to be swiveled to and supported by a tractor and provided with longitudinally disposed side cantilever members having downwardly extending rearward extremities corresponding with the forward ends of the side arms of the bed frame, and means for separably coupling said bed frame to said cantilever element, consisting of a longitudinally disposed rigid but separable pin and companion socket between the forward end of each side member of said bed frame and the lower extremity of the corresponding cantilever member, whereby a separable coupling or uncoupling movement through the longitudinal movement of the body frame or cantilever element is provided, and readily removable means for holding the pin and companion socket of each pin and socket couple connected.

TOBIAS WEBER.